INVENTOR
ALFRED W. SCHULTZ
ATTORNEYS

INVENTOR.
ALFRED W. SCHULTZ
BY Hudson, Doughton,
Williams, David & Hoffmann
ATTORNEYS April 25, 1961

A. W. SCHULTZ 2,981,391

CLUTCH

Filed Aug. 20, 1959

INVENTOR.
ALFRED W. SCHULTZ
BY Hudson, Boughton,
Williams, David & Hoffmann
ATTORNEYS United States Patent Office 2,981,391
Patented Apr. 25, 1961

2,981,391
CLUTCH

Alfred W. Schultz, Cleveland Heights, Ohio, assignor to The Cleveland Crane & Engineering Company, Wickliffe, Ohio, a corporation of Ohio Filed Aug. 20, 1959, Ser. No. 834,990

1 Claim. (Cl. 192—85)

The present invention relates to power presses and the like having a fluid operated clutch to intermittently drivingly connect a shaft for actuating the press with a rotating drive member concentric with the shaft.

A principal object of this invention is the provision of a new and improved power press or the like having a clutch actuated by a cylinder and piston type fluid motor including a fluid chamber structure attached to one of the clutch members, the piston and a wall of the fluid chamber structure having openings through which a shaft connected to the other clutch member extends, and including sealing means to prevent the escape of fluid from the chamber between the shaft and the chamber wall and between the shaft and the clutch actuating piston, which sealing means comprises spaced annular fixed concentric abutments on the shaft facing one another and a pair of movable sealing members disposed concentrically with the shaft between the abutments and rotatable with the chamber and piston, the fixed abutments being engageable by annular faces of the movable sealing members to form fluid-tight seals, and the moveable sealing members each having circumferentially spaced projections cooperating with the projections of the other to assure the rotation thereof as a unit while permitting their shifting into engagement with the fixed abutments when fluid is introduced into the chamber for actuating the clutch, each projection having a peripheral groove in substantial alignment with the groove about the sealing means, an annular resilient extension or garter spring being disposed in said groove and adapted to retain said rings in assembled relation while permitting limited axial movement with respect to one another for engagement with the fixed annular abutments whereby the sealing members are readily removable and replaceable as a unit and the engagement therebetween and the fixed abutments is effected substantially only when the shaft is rotating with the chamber structure and sliding friction and wear between the sealing surfaces is obviated.

The invention resides in certain details of constructions and combinations and arrangements of parts and further objects and advantages thereof will be apparent to those skilled in the art to which the invention relates from the following description of the presently preferred embodiment described with reference to the accompanying drawings forming a part of this specification in which similar reference characters designate corresponding parts, and in which, Fig. 1 is a front elevational view of a punch press embodying the invention;

Figure 1:
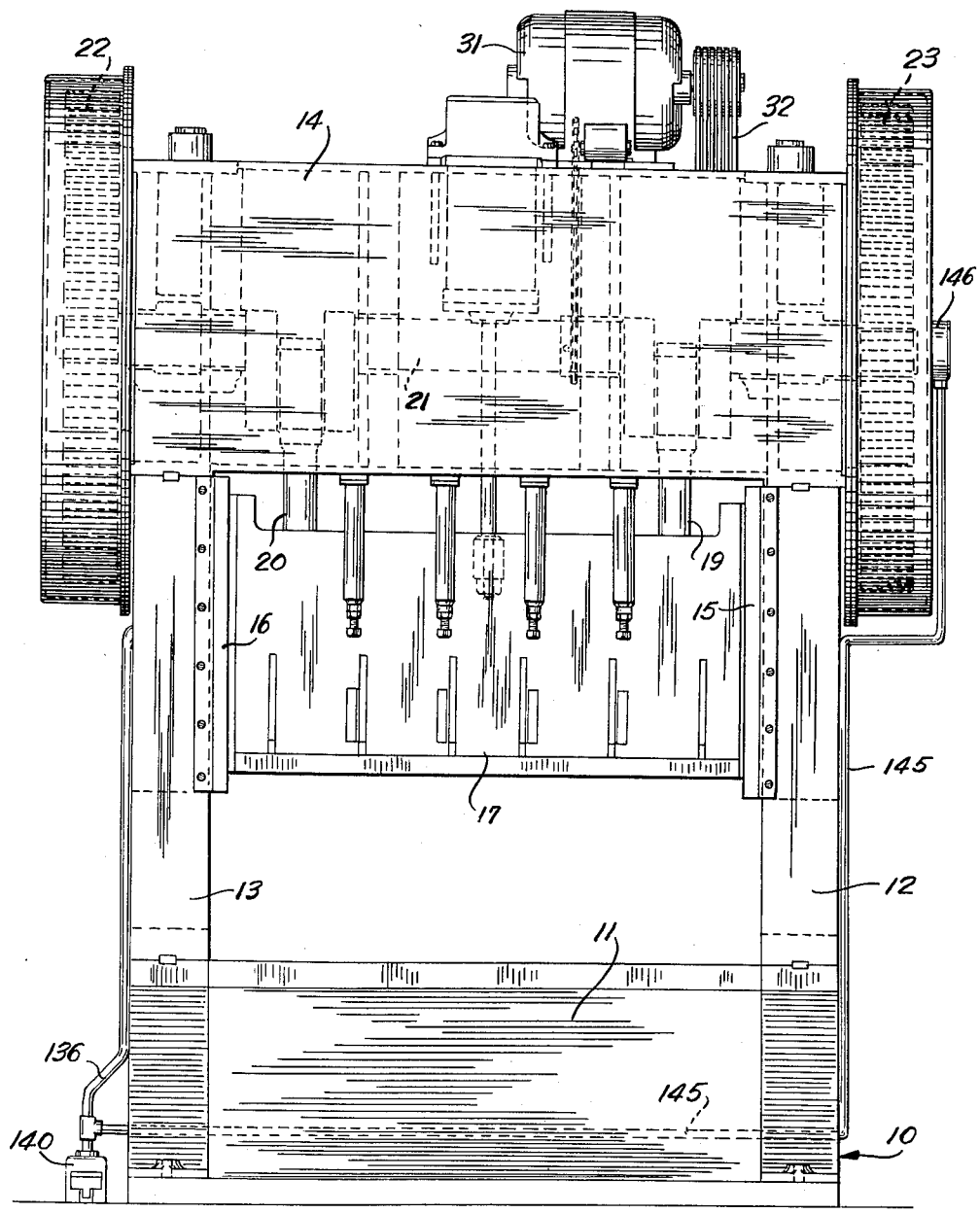
Figure 2:
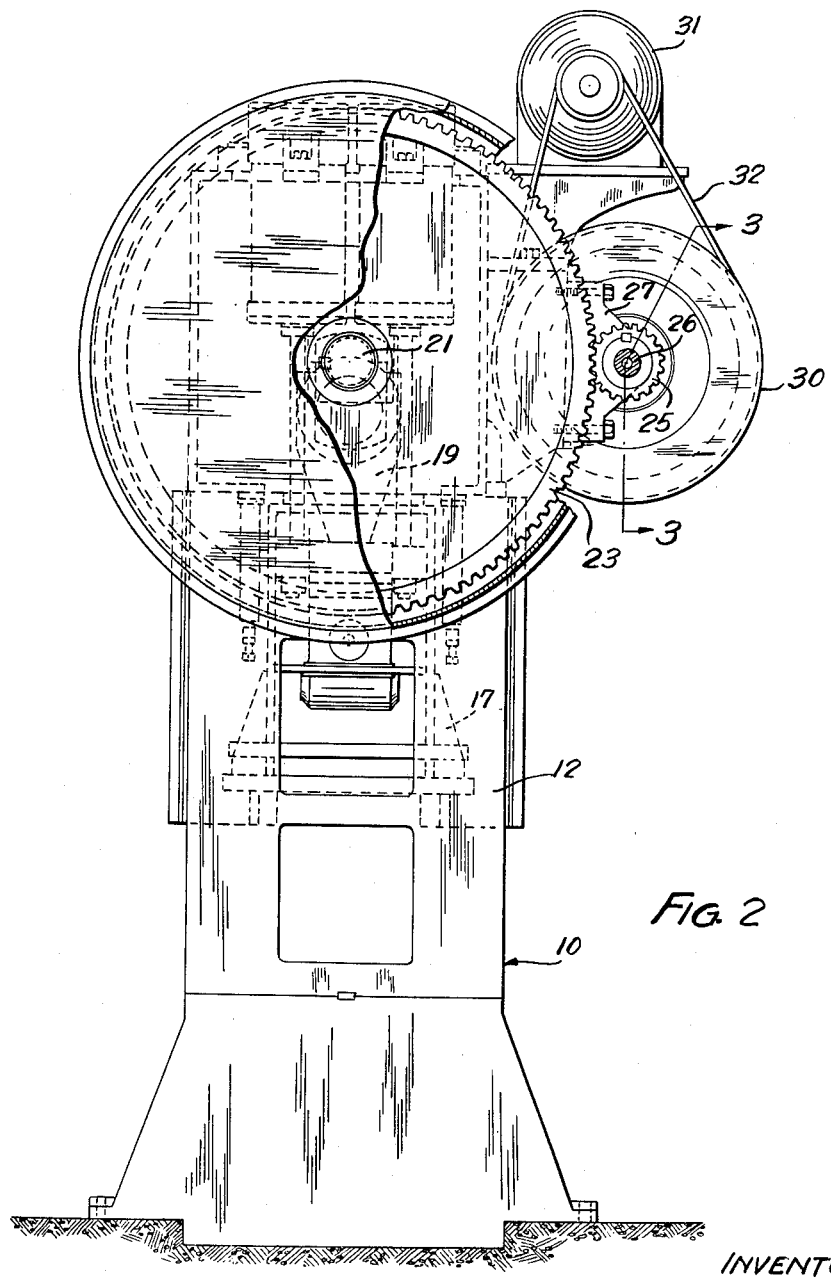
Fig. 2 is a side elevational view of the punch press showing certain parts thereof broken away.

Although the invention can be used in various mechanisms, it is particularly suitable for use in presses having intermittently reciprocable rams or punches, and for the purpose of illustration it is herein shown embodied in a punch press. The punch press comprises a frame 10 including a bed 11 having uprights 12, 13 at opposite sides interconnected by a crown 14 at the tops thereof. The uprights 12, 13 have guideways 15, 16 attached thereto which guide a ram or punch 17 vertically. The ram 17 is reciprocated by pitmans 19, 20 which are attached to the cranks of a shaft 21 journalled in the crown. The crank shaft 21 is driven by two bull gears 22, 23 attached to opposite ends thereof.

The bull gears 22, 23 are driven by pinions 25, only one of which is shown, which pinions are attached to the ends of a drive shaft 26 supported adjacent to its ends by two bearings 27, only one of which is shown, attached to the crown at opposite ends thereof.

The drive shaft 26 carries a flywheel 30 intermediate the bearings 27, which flywheel is journalled thereon, preferably by suitable antifriction bearings 28, so that the flywheel freely rotates on the shaft. The flywheel is driven by an electric motor 31, supported on the upper part of the press frame, through drive belts 32.

The flywheel 30 is intermittently connected in driving relation with the shaft 26 by a fluid clutch indicated generally at C, which clutch comprises a cylinder 34 having a cylindrical piston chamber 35 and an end wall or head 36 which has a cylindrical opening 37 for passing the shaft 26 and which accommodates a portion of the sealing means later described in detail.

The open end of the cylinder 34 has a radial flange 40 which is provided with a plurality of arcuate projections 41 which extend outwardly from the face of the flange and which have openings to receive bolts 42 by which the cylinder is attached to the side of the flywheel 30. The projections 41 are equally spaced about the cylinder and they provide space for separating the cylinder proper from the flywheel to permit free circulation of air between the cylinder and the flywheel, and in addition, have inwardly facing teeth or splines 43, the purpose of which will appear hereinafter. The cylinder 34 has attached thereto an annular sealing means retaining plate 45, secured by circumferentially spaced screws 46.

A clutch actuating piston 47 has a head end 48 reciprocable in the cylinder chamber 35 and the head end 48 of the piston has an axial opening 49 which receives the shaft 26 with clearance therebetween. The periphery of the head end 48 of the piston is undercut to receive a suitable piston ring 49 which may be of any suitable type and is here shown as a flexible ring U-shape in cross section.

The outer end of the piston 47 has an annular ring formation 50 which presents a smooth annular surface 51 lying in a plane normal to the drive shaft 26, the purpose of which will appear as the description proceeds. The periphery of the ring portion 50 has teeth 52 which mesh with the teeth or splines 43 of the cylinder so that the piston is rotated by the cylinder and it can move axially relative to the cylinder.

The piston 47 is normally urged toward the end 36 of the cylinder chamber by a plurality of compression springs 54, only one of which appears in the drawings, which are seated in recesses in the outer end of the cylinder and which surround bolts 55 which extend through openings in the portion 50 of the piston and the flange 40 of the cylinder member. The bolt heads are recessed in the ring portion and the outer ends have nuts and washers 57 against which the springs 54 press to urge the bolts outwardly to draw the piston to the left as viewed in Fig. 3.

Figures 3, 4, 5:
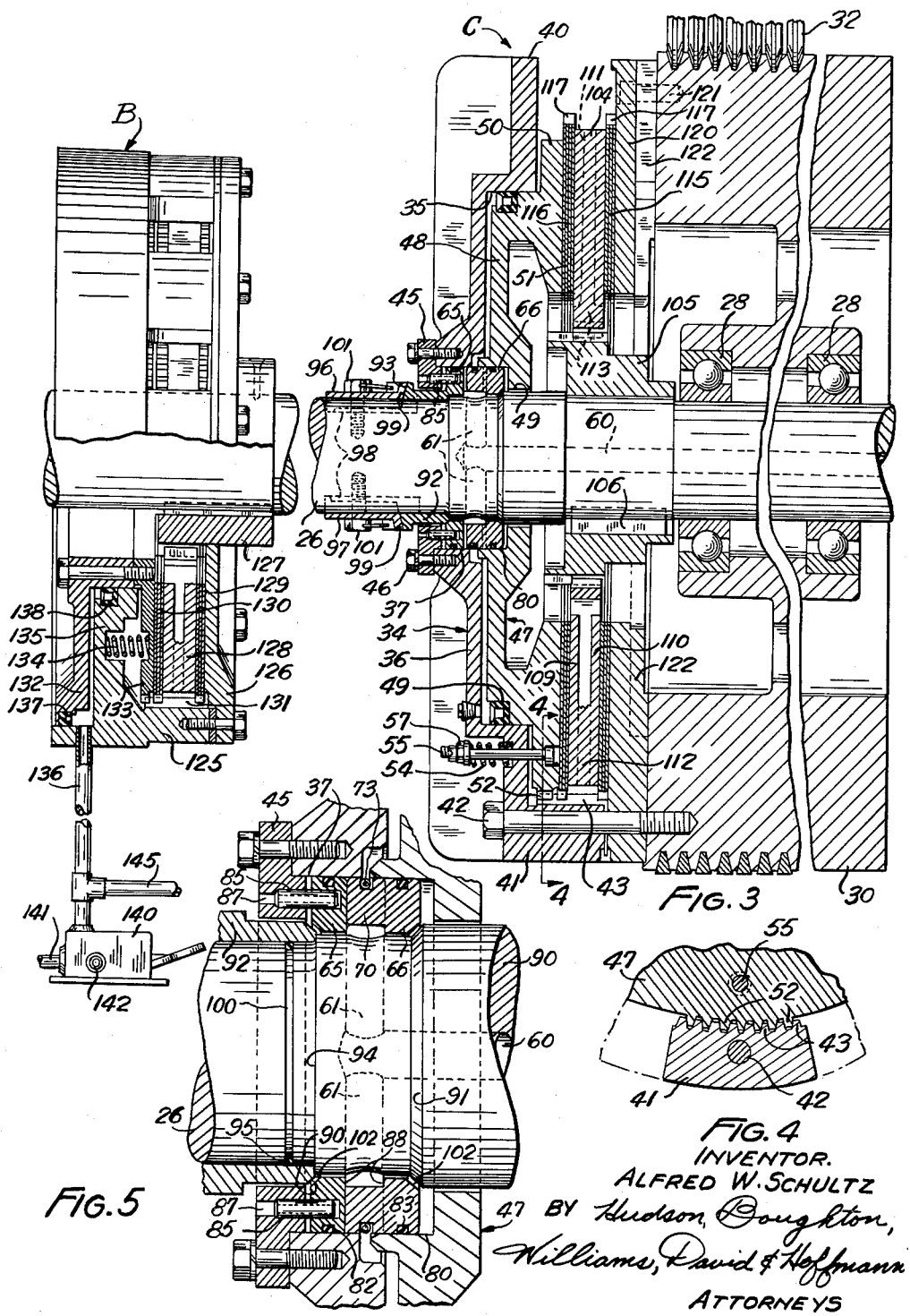
Fig. 3 is a fragmentary sectional view taken substantially along line 3—3 of Fig. 2, but on a larger scale.
Fig. 4 is a fragmentary sectional view taken substantially along line 4—4 of Fig. 3.
Fig. 5 is a fragmentary view, on an enlarged scale, of the mechanism shown in Fig. 3.
Figure 8:
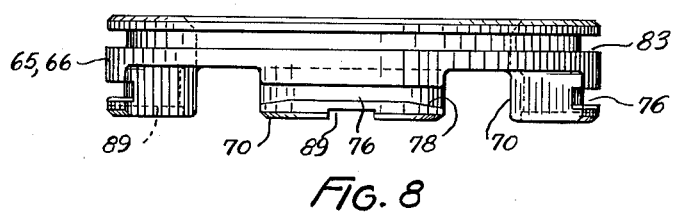
Fig. 8 is a side elevational view of the annular sealing member of Fig. 6.
Figure 6:
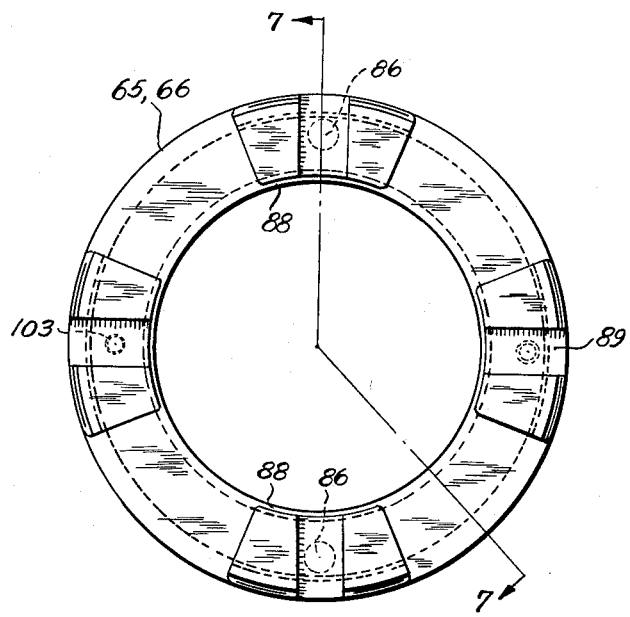
Fig. 6 is a front elevational view, on an enlarged scale, of one of the movable annular sealing members forming a part of the punch press.
Figure 7:
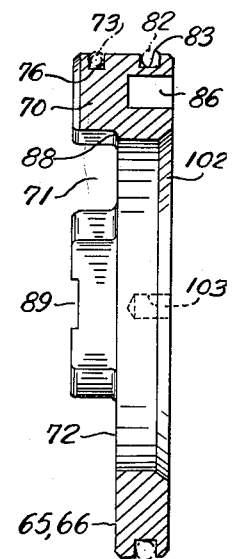
Fig. 7 is a sectional view of the sealing member of Fig. 6 taken substantially along line 7—7 thereof.

The piston 47 is forced to the right, as viewed in Fig. 3, to actuate the clutch by fluid pressure, such as air, introduced into the cylinder. In the present form of press, the drive shaft 26 has an axial bore or aperture 60 which extends from one end thereof to a point opposite the area between the cylinder head and piston, and radial bores or apertures 61 extending from the axial bore to the circumference of the shaft and forming openings or outlets communicating with the cylinder chamber between the cylinder head 36 and the end 48 of the piston. In the present form of press, air is introduced into the passage 60 by suitable means, described more fully hereinafter, and the escape of the air from the cylinder between the shaft and the cylinder and piston respectively is prevented by a readily removable and replaceable sealing means.

The preferred form of sealing means comprises a pair of annular movable sealing rings or members 65 and 66 which are concentric with the shaft 26 and are adapted to move axially thereof. The sealing rings 65, 66, best illustrated in Figs. 5–8, are preferably made of a composition material impregnated with lubricant and may be identical parts. Each is provided with a series of circumferentially spaced projections 70, herein illustrated as axially extending projections spaced approximately 90° apart. The projections 70 have spaces 71 therebetween and extend axially from the adjacent faces 72 of each ring, the spaces 71 of each ring being of a size to accommodate or receive in an interdigitated manner the projections 70 of the other of the rings.

Figure 9:
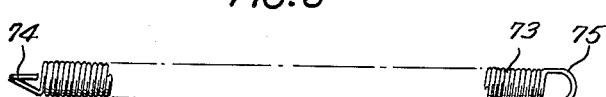
Fig. 9 is a partial side elevation of a spring embodied in the punch press.

The projections 70 cooperate to permit axial movement of the rings 65 and 66 toward and away from one another while preventing relative rotational movement therebetween. The rings 65 and 66 are retained in an assembled and interengaging condition by means of an extension spring 73, illustrated in Fig. 9 and referred to in the art as a garter spring, and which is adapted to have its hooked ends 74, 75 connected to form an annulus thereof and to lie in grooves 76 formed in the peripheral portions of each of the projections 70. It will be observed that when the rings 65 and 66 are in their assembled relation the grooves 76 are in substantial alignment and provide a substantially continuous annular groove such that, with the spring 73 lying therein, the rings are prevented from becoming disassembled. The spring 73 normally resiliently urges the rings 65, 66 together, however the grooves 76 are wider at the ends thereof as indicated at 78 in Fig. 8, thereby permitting the rings 65 and 66 to shift apart a limited distance with the spring 73 assuming a serpentine configuration.

The sealing rings 65, 66 are received respectively in the opening 37 of the cylinder 34, and in a recess 80 of the piston 47. The opening 37 and the recess 80 form a working chamber for the sealing means, one wall of which is defined by the removable sealing means retainer plate 45 through which the shaft 26 extends. The rings 65 and 66 are arranged to rotate together with the cylinder 34 and the piston 47 and are maintained in movable fluid-tight relation therewith by O-rings 82 disposed in grooves 83 of the rings.

Rotation of the interengaged rings 65 and 66 with the cylinder 34 is assured by the use of a pair of dowels 85 slidingly received in bores 86 of the ring 65 and in aligned bores in the plate 45. Openings 87 are provided in the plate 45 to provide breathing communication with the bores 86 through corresponding passages in the dowels 85.

When the ring members 65, 66 are in their normal position, that is urged together by the annular spring 73, they are engaged with one another as shown in Fig. 5, and are over the openings of the bores 61 in the shaft 26. The inner surfaces of the annular ring members adjacent to the central openings therethrough are relieved or stepped as shown at 88 to permit passage of air from the bores 61 into the cylinder and to cause the air to force the rings outwardly. In addition, radial grooves 89 are provided in the axially facing surfaces of the projections 70 of the annular members to permit passage of the air between the piston and cylinder head. The ring members 65, 66 have relatively close clearance with the shaft 26 so that the introduction of air between the rings causes them to be forced apart, as shown in Fig. 3.

The shaft 26 has two annular valve or abutment surfaces or seats 90, 91 concentric therewith, facing towards one another and located outwardly of the rings 65, 66. The valve or abutment surface 90 is preferably formed on a sleeve 92 closely fitting the shaft but slidable to the left therealong. The inner end of the sleeve is tapered to form the abutment or seat 90 and the outer end has a rim, the outer face of which is tapered to form a camming surface 93. The inner end of the sleeve 92 abuts a shoulder 94 formed on the shaft 26 and the sleeve is held to the shoulder by two cam blocks 96, 97 disposed in recesses 98 in opposite sides of the shaft and having cams 99 which engage the surface 93 and cam the sleeve to the shoulder when the blocks are forced into the recesses by screws 101 threaded into the side of shaft 26 and extending through the cam blocks. By the arrangement shown the sleeve 92 can be moved along the shaft 26 to permit the retaining plate 45 to be removed from the cylinder 34 for access to and removal or replacement of the ring members 65, 66, and the sleeve can also be pressed into air tight sealing engagement with the shoulder 94 to prevent passage of air between the shaft and sleeve.

Additional sealing means may be provided between the sleeve 92 and the shaft 26 such as an O-ring 95 or the like disposed in a groove 100 in the shaft. The annular valve surface or abutment 91 is conveniently formed on the shaft 26 so that it is integral therewith.

The annular members 65, 66 each has an annular valve surface 102 formed thereon which engages the annular abutment surfaces 90, 91 respectively, when the members are moved apart to the positions shown in Fig. 3, and form air tight seals therewith. Since the piston 45 is moved to the right by air pressure in the cylinder to actuate the clutch to drivingly connect the flywheel 30 to the shaft 26, the members 65, 66 will rotate with the surfaces or abutments 90, 91 during the time they are in sealing engagement therewith. When the clutch is released by exhausting the cylinder chamber 35, the members 65, 66 move from their respective abutments so that they then rotate free of the shaft 26 and the surfaces 90, 91. Sliding friction is thus eliminated between the sealing surfaces during relative rotation between the cylinder 34 and piston 45 which always rotate as a unit and the shaft 26 thereby providing a highly efficient and long lasting seal. In effect the members 65, 66 are in the nature of movable valve elements which are moved, upon introduction of fluid pressure into the cylinder, from an open position into engagement with valve seat surfaces 90, 91 of stationary valve elements to prevent the flow of pressure fluid between the surfaces 102 of the movable valve elements 65, 66 and the surfaces 90, 91 on the stationary valve element.

The ring members 65, 66, by reason of their interengaging projections 70 and the annular spring 73, form a sealing ring assembly which can be removed and replaced as a unit. To facilitate handling of the assembled ring members, threaded openings 103 are provided in which screws may be inserted to serve as handles for inserting the assembly into the clutch chamber or withdrawing it therefrom. The two dowels 85 are readily insertable into the ring 65 and are easily engaged by the retaining plate 45 when replacing the sealing rings.

The reciprocation of the piston 47 by air pressure in the cylinder actuates suitable clutching members to clutch the flywheel with the shaft 26, and in the form shown, the clutch includes a center clutch plate 104, having a toothed axial opening supported on a splined hub 105 keyed to a shaft 26 by key 106. The teeth of the plate 104 mesh with the splines of the hub so that the plate rotates the shaft 26 through the hub and can move axially thereof. The clutch plate 104 is preferably formed of two spaced annular walls 109, 110 which present smooth outer surfaces and which are separated by radial webs 111, 112, alternately spaced about the plate and the webs 111 extending from the hub to the outer edge of the plate and the webs 112 extending from the periphery of the plate and terminate approximately mid-way between the periphery and hub of the plate. The plate walls 109, 110 have openings 113 intermediate the webs 111 providing for the circulation of air from the hub of the plate outwardly between the walls and webs 111, 112 to maintain the plate relatively cool.

A pair of suitable clutch disks 115, 116 are on opposite sides of the clutch plate 104 and the disks are preferably formed of annular flat rings having suitable composition facing on opposite sides and having teeth 117 at the periphery thereof which mesh with the teeth or splines 43 of the cylindrical member so that the clutch disks rotate with the cylinder 34 and the flywheel 30 and they can move axially. Te clutch disks are preferably split so that they are in segments which can be removed and replaced from the sides of the shaft 26 when the cylinder 34 is detached and moved from the flywheel along the shaft 26. Furthermore, the teeth 117 could be omitted and the disks could float.

The clutch disk 115 abuts a flat ring shaped member 120 which is bolted to the side of the flywheel 30 by bolts 121, only one of which appears in the drawings, and the side of the plate 120 facing the flywheel has a series of radial impeller blades 122 formed thereon which causes air to circulate between the flywheel and plate 120 and carry away heat generated by operation of the clutch.

The clutch disk 116 is engaged by the surface 49 of the piston 47 and when the piston is actuated by fluid pressure as described hereinbefore, the force of the piston causing the clutch disks 115, 116 to frictionally grip the clutch plate 104 and thereby drive the shaft 26.

Preferably, a fluid pressure released brake B is provided to brake the drive shaft 26 when the clutch C is disengaged. A brake of any suitable construction may be employed, and in the form shown it comprises an annular cylinder member 125 concentric with shaft 26 and having an end plate 126. A hub 127 is attached to the shaft 26 and extends into the cylinder member 125 and a brake plate 128, which is preferably similar in construction to the center clutch plate described hereinbefore, is splined to the hub and is adapted to move axially relative to the shaft 26 while rotating therewith. Two annular friction disks 129, 130 are disposed on opposite sides of the brake plate 128 and in the form shown, the disks have teeth about the periphery thereof which mesh with splines 131 formed about the interior of the cylinder member 125 to prevent rotation thereof. The friction disks 129, 130 are preferably split so that the segments thereof could be removed and replaced from the sides of the shaft 26, and if desired, the teeth at the periphery thereof could be omitted and the disks permitted to float. The friction disk 130 is normally pressed against the adjacent face of the brake plate 128 and in turn urges the plate into frictional engagement with friction disk 129 by an annular piston member 132 having a flange 133 which engages the friction disk 130, and the piston is urged against the friction disk by a plurality of springs 134 interposed between the flange 133 of the piston and an annular wall 135 projecting inwardly from the periphery of the cylinder member 125. The piston member 132 is adapted to be moved to the left, as viewed in Fig. 3, and release the brake plate 128 from frictional engagement with the friction disks 129, 130, by air pressure entering the cylinder through a pipe 136 into the area between the piston and the wall 135 of the cylinder member. Preferably, the piston 132 is undercut about the periphery thereof to provide a seat for a ring seal 137 which prevents escape of air from between the piston and cylinder. The inner annular portion of the wall 135 is also undercut to accommodate a ring seal 138 between the web and the central portion of the piston.

The pipe 136 is connected with a treadle operated fluid valve 140 which is accessible to the operator of the press, and the inlet of which is connected by a pipe 141 with a suitable source of fluid pressure, not shown. Normally, the valve 140 is in a position to exhaust pipe 136 to a sump or the atmosphere through port 142, and when the treadle is depressed the valve is operated to connect pipe 136 with the fluid pressure supply through pipe 141.

A pipe 145 is connected at one end to pipe 136 and the opposite end is connected to the end of shaft 26 and with the bore 60 through a suitable rotary seal mechanism 146.

It will be seen that by depressing the treadle of the valve 140, fluid pressure is directed into the clutch C to drivingly connect the flywheel 30 with the shaft 26 and at the same time fluid pressure is directed into the brake B to release the shaft 26. When the treadle valve 140 is released the clutch and brake are exhausted, causing the clutch to disengage the flywheel from the shaft 26 and springs 134 to apply a braking force to the shaft 26 by pressing flange 133 against the friction disk 129, as described.

It will be apparent that the advantages enumerated as well as others have been attained and that there is provided a new and improved press mechanism and fluid operated clutch having reliable non-wearing sealing means which is positive in action and provides low cost construction and maintenance. The sealing means can be conveniently disassembled to permit removal of the cylinder 34 from the flywheel to gain access to the clutch friction disks for replacement, etc.

While the preferred form of the invention has been described in considerable detail, it will be apparent that the invention is not limited to the constructions shown and it is my intention to cover hereby all adaptations, modifications and changes therein which come within the practice of those skilled in the art to which the invention relates and the scope of the appended claim.

Having thus described my invention, I claim:

In a press or the like, a shaft having an internal aperture opening into its circumference intermediate its ends, a drive element rotatably supported on said shaft, fluid operated clutch means to drivingly connect said shaft and drive element and comprising a cylinder concentric with said shaft and connected to said drive element for rotation therewith, a piston reciprocable in and rotatable with said cylinder, said piston and an end wall of said cylinder having axial openings through which said shaft extends, spaced annular concentric abutment means on said shaft at opposite sides of said opening of said aperture into the circumference of said shaft, a pair of sealing members concentric with said shaft and disposed between said abutment means, means mounting said sealing members on said piston and cylinder respectively for movement axially of said shaft and forming fluid-tight seals between said piston and cylinder and the respective sealing members supported thereby, said abutment means and said sealing members having cooperating annular faces concentric to said shaft adapted to sealingly engage and provide spaced fluid seals between said piston and said shaft and said cylinder and said shaft at opposite sides of said opening of said aperture into the circumference of said shaft, circumferentially spaced axially extending projections on said sealing members interdigitated with one another and having peripheral grooves in substantial alignment with one another to form an annular groove, and an annular extension spring disposed in said annular groove for maintaining said sealing members in assembled relation and resiliently biasing them toward one another.

References Cited in the file of this patent

UNITED STATES PATENTS

| | | |
|---|---|---|
| 1,967,065 | Rasmussen | July 17, 1934 |
| 2,169,639 | Grote | Aug. 15, 1939 |
| 2,221,014 | Williamson | Nov. 12, 1940 |
| 2,741,353 | Ward | Apr. 10, 1956 |
| 2,759,583 | Ward | Aug. 21, 1956 |
| 2,761,709 | Gilbert | Sept. 4, 1956 |
| 2,777,702 | Rodal | Jan. 15, 1957 |